United States Patent
Oguma et al.

(10) Patent No.: US 8,902,442 B2
(45) Date of Patent: Dec. 2, 2014

(54) IMAGE FORMING SYSTEM AND METHOD IN WHICH CLIENT APPARATUSES ARE NOTIFIED VIA PRINT SERVER OF EVENT GENERATED IN IMAGE FORMING APPARATUS

(71) Applicant: KYOCERA Document Solutions Inc., Osaka (JP)

(72) Inventors: Takashi Oguma, Osaka (JP); Yoshiyuki Taira, Osaka (JP); Takehiko Asano, Osaka (JP)

(73) Assignee: KYOCERA Documents Solutions Inc. (JP)

( * ) Notice: Subject to any disclaimer, the term of this patent is extended or adjusted under 35 U.S.C. 154(b) by 0 days.

(21) Appl. No.: 13/926,086

(22) Filed: Jun. 25, 2013

(65) Prior Publication Data

US 2014/0002841 A1     Jan. 2, 2014

(30) Foreign Application Priority Data

Jun. 29, 2012   (JP) ................... 2012-146203
Jun. 29, 2012   (JP) ................... 2012-146204

(51) Int. Cl.
    *G06F 3/12*           (2006.01)
    *G06K 15/02*         (2006.01)

(52) U.S. Cl.
    CPC .......... *G06K 15/1806* (2013.01); *G06F 3/1207* (2013.01); *G06F 3/1229* (2013.01); *G06F 3/1259* (2013.01); *G06F 3/1288* (2013.01)
    USPC ........ 358/1.13; 358/1.15; 358/1.14; 709/203; 709/217; 709/219

(58) Field of Classification Search
    USPC ........ 358/1.15, 1.13, 1.14; 709/203, 217, 219
    See application file for complete search history.

(56) References Cited

U.S. PATENT DOCUMENTS

| | | | |
|---|---|---|---|
| 2004/0190050 A1 | 9/2004 | Sunohara | |
| 2005/0213115 A1* | 9/2005 | Johnson et al. | 358/1.1 |
| 2009/0190166 A1* | 7/2009 | Nakamura et al. | 358/1.15 |
| 2013/0120784 A1* | 5/2013 | Takagi | 358/1.14 |

FOREIGN PATENT DOCUMENTS

| | | |
|---|---|---|
| JP | 2000-259363 | 9/2000 |
| JP | 2005-071302 A | 3/2005 |
| JP | 2005-107837 A | 4/2005 |

OTHER PUBLICATIONS

Extended European Search Report and Opinion for App. No. EP 13174126.6, mailed Jun. 25, 2014, 11 pages.

* cited by examiner

*Primary Examiner* — Jacky X Zheng

(74) *Attorney, Agent, or Firm* — McDonnell Boehnen Hulbert & Berghoff LLP

(57) ABSTRACT

An image forming system includes a client apparatus, a print server, and an image forming apparatus, each of which are coupled via a network to one another. The client apparatus provides a job ID together with an IP address of the client apparatus to the print server, and transmits print job data to the image forming apparatus via the print server. The print server registers the job ID and the IP address in a job address table, receives content of an event transmitted from the image forming apparatus, reads an IP address associated with a job ID included in the content of the event from the job address table when the event is a change in job status, and transmits the content of the event to a client having the read IP address.

18 Claims, 10 Drawing Sheets

JOB ADDRESS TABLE

| JOB ID | IP ADDRESS |
|---|---|
| GUID1 | 192.168.2.12 |
| GUID2 | 192.168.2.15 |
| ⋮ | ⋮ |

EVENT TABLE

| STATUS CODE | NAME OF STATUS CODE |
|---|---|
| 0100 | Start |
| 0101 | Stop |
| 0102 | Pause |
| 0103 | Resume |
| 0104 | Completed |
| 0200 | Ready |
| 0201 | Printing |
| 0202 | Out of Toner |
| ⋮ | ⋮ |

Fig. 5B

IMAGE FORMING SYSTEM AND METHOD IN WHICH CLIENT APPARATUSES ARE NOTIFIED VIA PRINT SERVER OF EVENT GENERATED IN IMAGE FORMING APPARATUS

INCORPORATION BY REFERENCE

This application is based upon, and claims the benefit of priority from, corresponding Japanese Patent Application Nos. 2012-146203 and 2012-146204, filed in the Japan Patent Office on Jun. 29, 2012, the entire contents of which are incorporated herein by reference.

FIELD

The present disclosure relates to an image forming system and an image forming method in which a client apparatus is notified via a print server of an event generated in an image forming apparatus.

BACKGROUND

In a typical image forming system in which an image forming apparatus is shared by a plurality of client apparatuses using a print server connected to a network, when an error is generated in the image forming apparatus, the print server notifies each client apparatus of the content of the error. As a result, a user of each client apparatus can know of the status of the image forming apparatus.

Since the print server notifies each client of status changes of the statuses of jobs, the amount of communication traffic on the network is increased. Usually, it suffices for each user to know of a status change in his/her job.

SUMMARY

The present disclosure relates to an image forming system and an image forming method that cause the amount of traffic on a network to be reduced by omitting unnecessary event notifications transmitted from a print server to each client apparatus.

An image forming system according to an embodiment of the present disclosure includes a client apparatus, a print server and an image forming apparatus, each of which are coupled to a network.

The client apparatus includes a status monitor, a printer driver, and a client-side notification service. The printer driver is configured to i) convert document data into print job data, ii) generate a job ID of the print job data, iii) provide the job ID to a client-side notification service of the client apparatus, and iv) transmit the print job data to the image forming apparatus via the print server. The client-side notification service is configured to i) transmit the provided job ID together with an IP address of the client apparatus to a server-side notification service of the print server via the network and ii) cause content of an event received from the server-side notification service to be displayed on a status monitor.

The print server includes a job address table and a server-side notification service. The job address table includes a field in which the IP address of the client apparatus is associated with the job ID. The server-side notification service is configured to i) register the job ID and the IP address received from the client-side notification service in the job address table, ii) receive content of an event transmitted from the image forming apparatus via the network, iii) read an IP address associated with a job ID included in the content of the event from the job address table when the event is a change in job status, and iv) transmit the content of the event to the client-side notification service of the client apparatus having the read IP address.

An image forming method according to an embodiment of the present disclosure is performed by a client apparatus that is coupled to a network, a print server that is coupled to the network, and an image forming apparatus that is coupled to the network. The client apparatus converts document data into print job data, generates a job ID of the print job data, transmits the print job data to the image forming apparatus via the print server, transmits the job ID together with an IP address of the client apparatus to the print server, and causes content of an event received from the print server to be displayed on a status monitor of the client apparatus. The print server registers the job ID and the IP address received from the client apparatus in the job address table, receives content of an event transmitted from the image forming apparatus, reads the IP address associated with the job ID included in the content of the event from the job address table when the event is a change in job status, and transmits the content of the event to the client apparatus having the read IP address.

Additional features and advantages are described herein, and will be apparent from the following Detailed Description and the figures.

BRIEF DESCRIPTION OF THE FIGURES

In the accompanying drawings:

FIG. 5A is schematic diagram illustrating the configuration of a job address table;

FIG. 5B is a schematic diagram illustrating the configuration of an event table showing the relationship between a status code and the name of the status code;

DETAILED DESCRIPTION

I. First Embodiment

Figure 1:
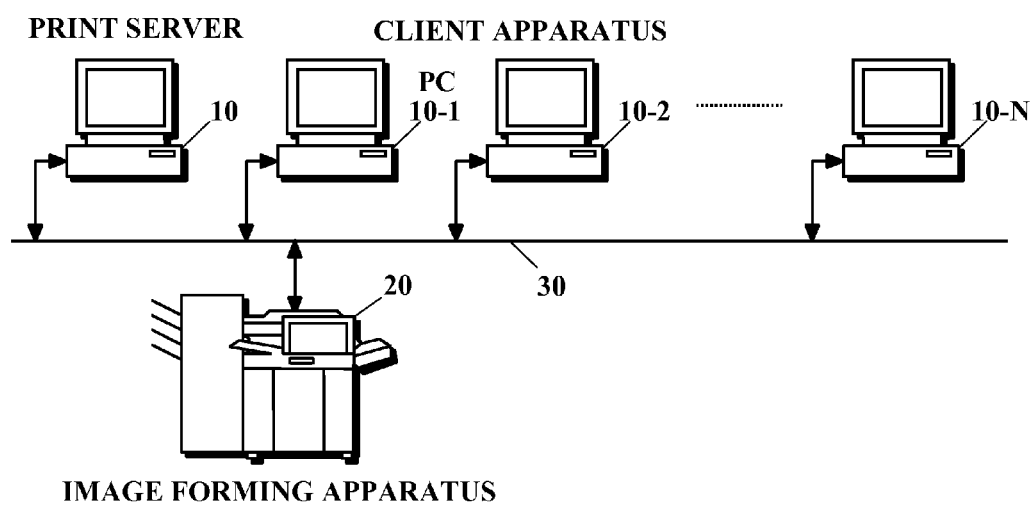
FIG. 1 is a schematic diagram illustrating the configuration of an image forming system according to a first embodiment of the present disclosure.

FIG. 1 is a schematic diagram illustrating the configuration of an image forming system according to a first embodiment of the present disclosure.

In the image forming system, (i) a print server 10 used as a manager computer and a print server, (ii) N client apparatus PCs 10-1 to 10-N, and (iii) an image forming apparatus 20 are coupled to one another via a network 30. The network is configured to cause the print server 10 to communicate with the image forming apparatus 20 and to cause the print server 10 to communicate with the client apparatus PCs 10-1 to 10-N.

Figure 2:
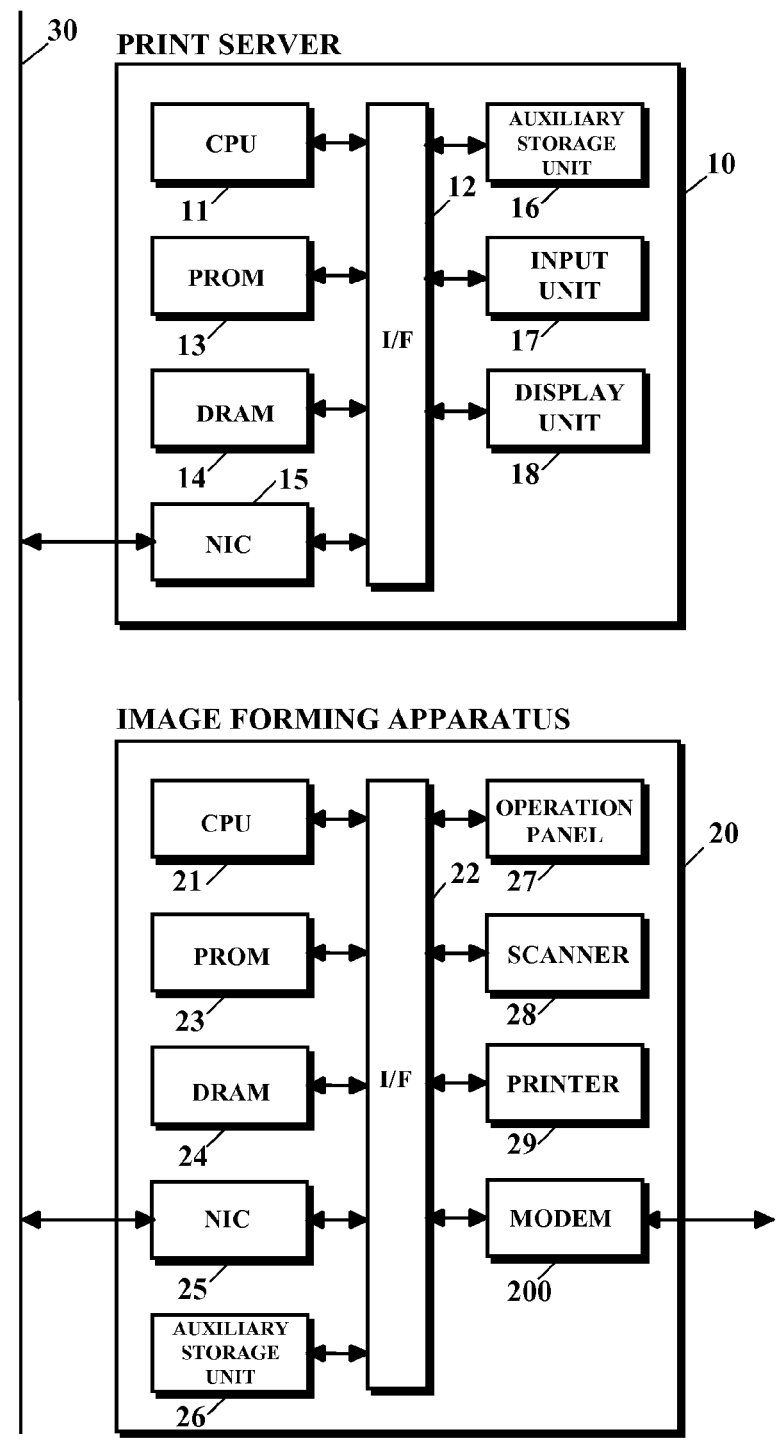
FIG. 2 is a block diagram illustrating the hardware configurations of a print server and an image forming apparatus in the image forming system.

FIG. 2 is a block diagram illustrating the hardware configurations of the print server 10 and the image forming apparatus 20 that form part of the image forming system.

In the print server 10, a central processing unit (CPU) 11 is coupled to a programmable read only memory (PROM) 13, a dynamic random access memory (DRAM) 14, a network interface 15, an auxiliary storage unit 16, an input unit 17, and a display unit 18 via an interface 12. Multiple types of interfaces are represented as a single functional block 12. The hardware configurations of the client apparatus PCs 10-1 to 10-N are similar to the hardware configuration of the PC 10.

The PROM 13, which is, for example, a flash memory, stores a basic input/output system (BIOS). The DRAM 14 is used as the main memory. The auxiliary storage unit 16 stores an operating system (OS), various drivers, and applications that realize the functions of the manager computer and the print server. The input unit may include, for example, a keyboard and a pointing device.

In the image forming apparatus 20, a CPU 21 is coupled via an interface 22 to a PROM 23, a DRAM 24, a network interface 25, an auxiliary storage unit 26, an operation panel 27, a scanner 28, a printer 29, and a fax modem 200.

The PROM 23, which may be, for example, a flash memory, may store a BIOS, an OS, various drivers, and various applications that realize the various functions of the image forming apparatus. The DRAM 24 is used as the main memory. The auxiliary storage unit 26 stores print data, image data read by the scanner 28, document data received from the client apparatus PCs 10-1 to 10-N via the print server 10, and facsimile reception data as document files. The operation panel 27 includes an input unit and a display unit. The scanner 28 changes an image on a paper medium to an electronic image, and an electronic image file is used for printing, facsimile transmission, or file transmission. The printer 29 includes a print engine, a paper feed unit, a paper transport unit, and a paper output unit. Based on provided bitmap data generated in the DRAM 24, an electrostatic latent image is formed on a photoconductor drum. The electrostatic latent image is developed with toner, a toner image is transferred to paper and fixed thereon, and the paper is output.

The network interfaces 15 and 25 are coupled to the network 30.

Figure 3:
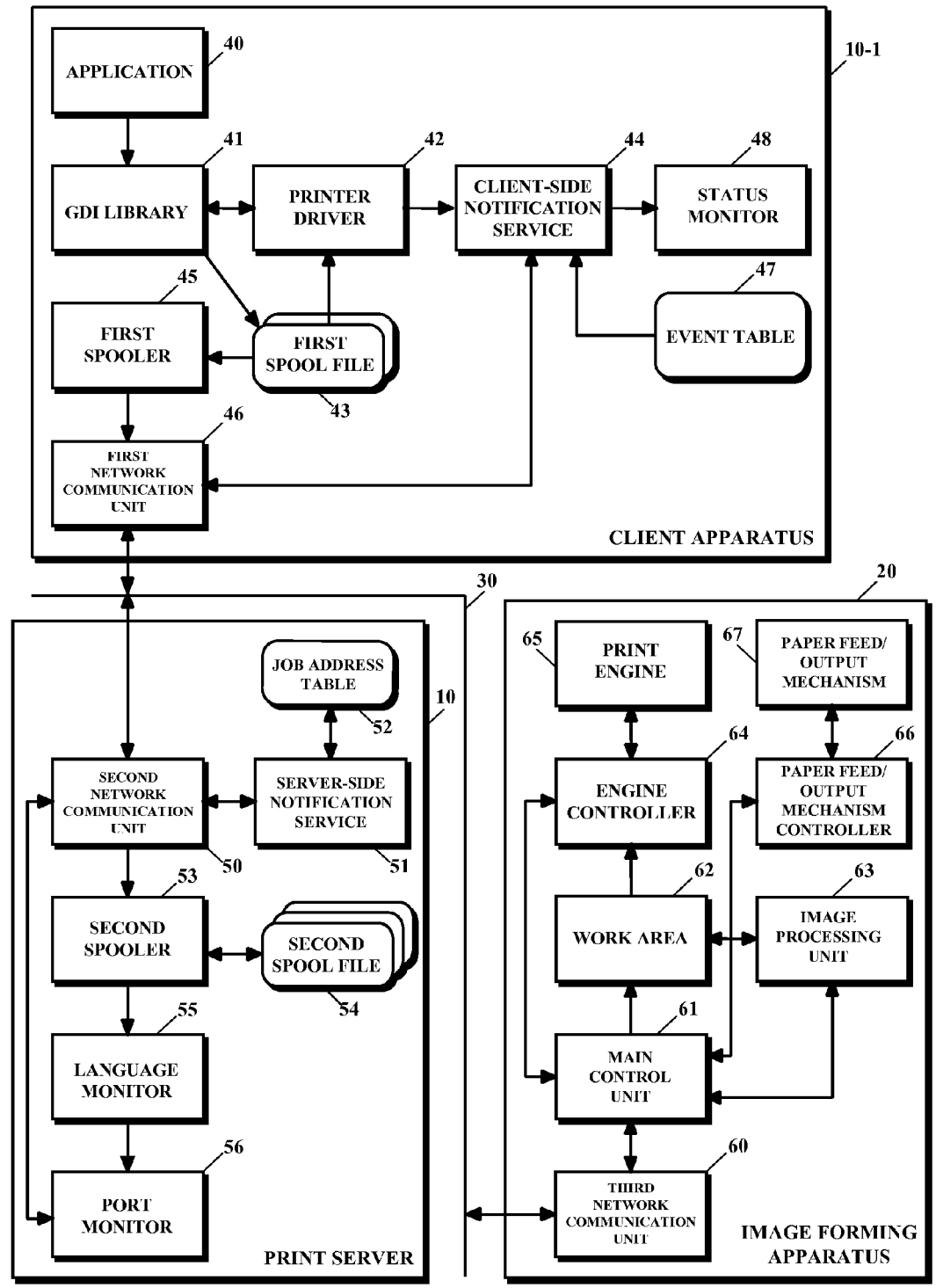
FIG. 3 is a block diagram illustrating the functional configurations of a print server, a client apparatus, and an image forming apparatus, each of which are part of the image forming system.

FIG. 3 is a block diagram illustrating the functional configurations of the print server 10, the client PC 10-1, and the image forming apparatus 20, each of which are part of the image forming system. The client PC 10-1 in this figure is also representative of the client PCs 10-2 to 10-N. The configurations of the PCs 10-2 to 10-N are similar to the configuration of the PC 10-1. In the description below, the OS is assumed to be Windows®.

Each of the functional blocks illustrated in FIG. 3 and the operations thereof are now described with reference to the flowcharts illustrated in FIGS. 4A and 4B and FIG. 6.

Figure 4A:
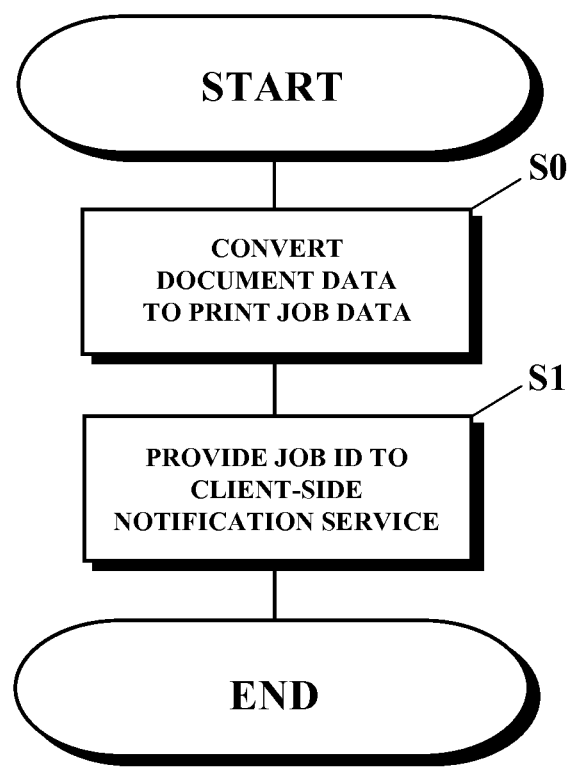
FIG. 4A is a flowchart illustrating the operations of functional blocks in the client apparatus.

FIG. 4A is a flowchart illustrating the operations of functional blocks 40 to 42 in the client PC 10-1.

In step S0, an application 40 converts document data to print job data by calling a function within a Graphic Device Interface (GDI) library 41. At this time, a GDI function (i) converts GDI drawing data to page description language (PDL) data that can be interpreted by the image forming apparatus 20 and (ii) writes the data into a first spool file 43, both via a printer driver 42.

In step S1, the conversion process for a single job ends when the application 40 calls the EndDoc function within the GDI library 41. The printer driver 42 generates a globally unique identifier (GUID), and writes the GUID into the first spool file 43 as a job ID. The printer driver 42, by providing the job ID to a client-side notification service 44, requests registration of the job ID. The client-side notification service 44, which is a resident program, is activated by the OS at power-on of the client PC 10-1 and operates in the background so as to always receive input.

Figure 4B:
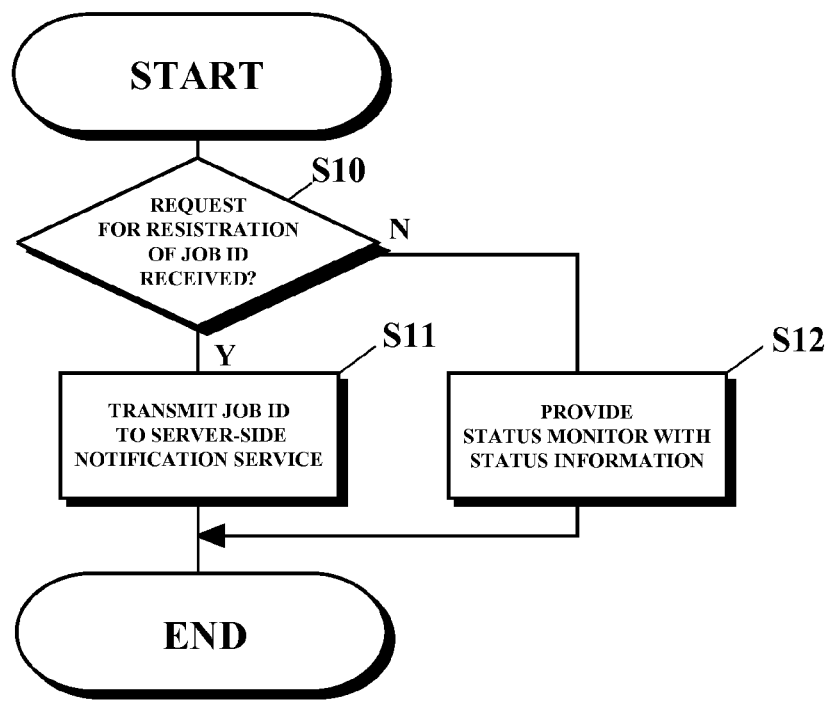
FIG. 4B is a flowchart illustrating the process of a client-side notification service in the client apparatus.

FIG. 4B is a flowchart illustrating the process of the client-side notification service 44.

In step S10, when the client-side notification service 44 receives a request for registration of a job ID, the flow proceeds to step S11; otherwise the flow proceeds to step S12 described later.

In step S11, the client-side notification service 44 transmits, together with the IP address of the client PC 10-1, the job ID to be registered to a server-side notification service 51 via a first network communication unit 46, the network 30, and a second network communication unit 50. The server-side notification service 51, which is a resident program similar to the client-side notification service 44, is activated by the OS at power-on of the client PC 10-1 and operates in the background so as to always receive input.

Figure 5A:
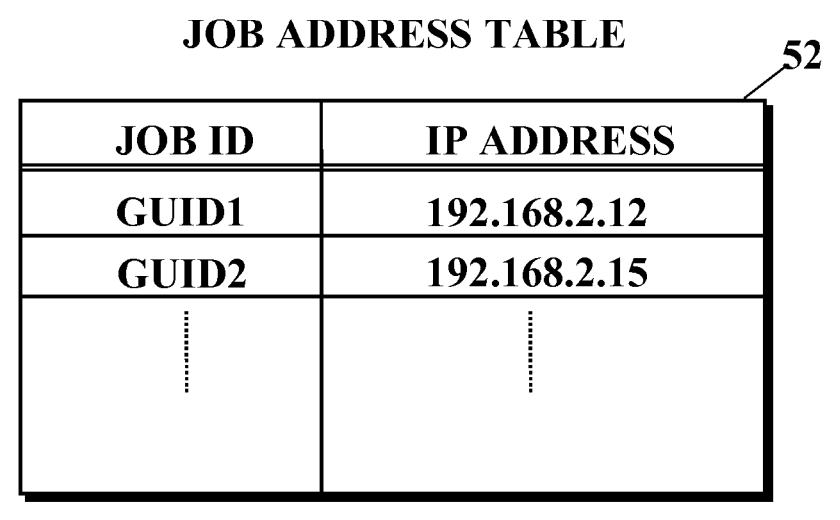

The server-side notification service 51, upon receipt of the job ID and the IP address, registers these as a single record in a job address table 52 illustrated in FIG. 5A.

Communication between the client-side notification service 44 and the server-side notification service 51 is performed using a Simple Object Access Protocol (SOAP) or a Simple Network Management Protocol (SNMP).

Here, the process of a job will be described. After the print job data is written into the first spool file 43, a first spooler 45 puts the identifier of the print job data in a queue. Every time an identifier is taken out from the head of the queue, the first spooler 45 supplies the first spool file 43 to a second spooler 53 via the first network communication unit 46 and the second network communication unit 50. Normally, the second spooler 53 causes a port monitor 56 to transmit (via a language monitor 55) second spool files 54 to the image forming apparatus 20 in the order in which they were spooled. The port monitor 56 transmits the second spool file 54 to a main control unit 61 via both the second network communication unit 50 and a third network communication unit 60.

Work area 62 includes a buffer area in which the main control unit 61 stores print job data that is included in the received second spool file 54. After storing print job data included in the received second spool file 54, the main control unit 61 develops the print job data into bitmap data using an image processing unit 63. The main control unit 61 prints an image based on the bitmap data by (i) supplying the developed bitmap data to a print engine 65 via an engine controller 64 and (ii) controlling a paper feed/output mechanism 67 via a paper feed/output mechanism controller 66.

When an error is generated in the print engine 65, the paper feed and output mechanism 67, or other portions of the image forming apparatus 20, the main control unit 61 transmits the content of the error as a status change event of the image forming apparatus 20 to the server-side notification service 51 via the third network communication unit 60 and the second network communication unit 50.

The content of an event includes a status code and, if the status code indicates a job status, a job ID.

FIG. 5B is a schematic diagram illustrating the configuration of an event table 47 showing the relationship between a status code and the name of the status code. The two highest-order digits of the status code represent a status type code. For example, the two highest-order digits of the status code indicating "01" show that the type of status is a job. The two highest-order digits of the status code indicating "02" show that the type of status is an image forming apparatus. Further, for example, "Start", "Stop", "Pause", "Resume" and "Completed", which are the names of the status codes, respectively indicate the starting, stopping, pausing, resumption, and completion of a job.

Figure 6:
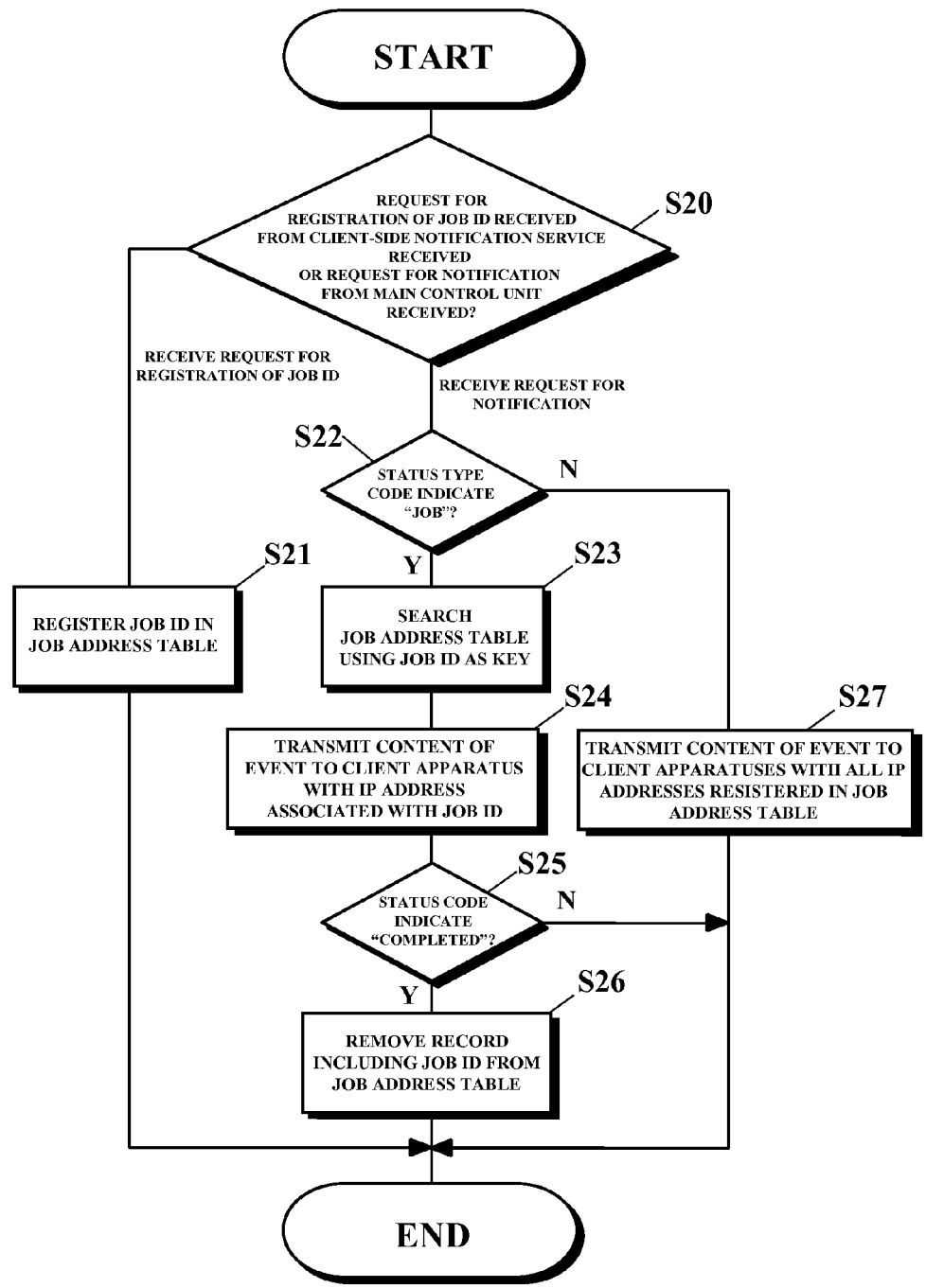
FIG. 6 is a flowchart illustrating the process of a server-side notification service in the print server.

FIG. 6 is a flowchart illustrating the process of the server-side notification service 51.

In step S20, the flow proceeds to step S21 when the server-side notification service 51 receives a request for registration of a job ID from the client-side notification service 44. In step S20, the flow proceeds to step S22 when the server-side notification service 51 receives a request for notification from the main control unit 61.

In step S22, when the status type code indicates a job ("01"), the flow proceeds to step S23. Otherwise, for example, when the status type code indicates an image forming apparatus ("02"), the flow proceeds to step S27.

In step S23, the server-side notification service 51 searches the job address table 52 using the job ID as the key.

In step S24, when a record is found in the search, the server-side notification service 51 transmits the content of the event, along with an IP address included in the record as the transmission address, to the client-side notification service 44 via the second network communication unit 50 and the first network communication unit 46.

In step S12 illustrated in FIG. 4B, the client-side notification service 44, after converting the status code included in the content of the event to the corresponding name by referring to the event table 47, provides a status monitor 48 with the name of the event together with the job ID and any other content, such as a toner level, included in the content of the event. As a result, the content displayed in a status display window (not illustrated) is updated. Note that when the status display window is not being displayed, the status display window is displayed as a popup window.

In step S25, when the status code indicates the completion of the job, the flow proceeds to step S26; otherwise, the process illustrated in FIG. 6 ends.

In step S26, the server-side notification service 51 (i) removes from the job address table 52 the record corresponding to the job ID and (ii) finishes the process illustrated in FIG. 6.

In step S27, the server-side notification service 51 transmits the content of the event to the client-side notification services 44 with all the IP addresses registered in the job address table 52 as the destination addresses.

As a result, a user can display only the job status of his/her own job on the status monitor 48. Further, the amount of communication traffic on the network 30 can be reduced.

II. Second Embodiment

Figure 7:
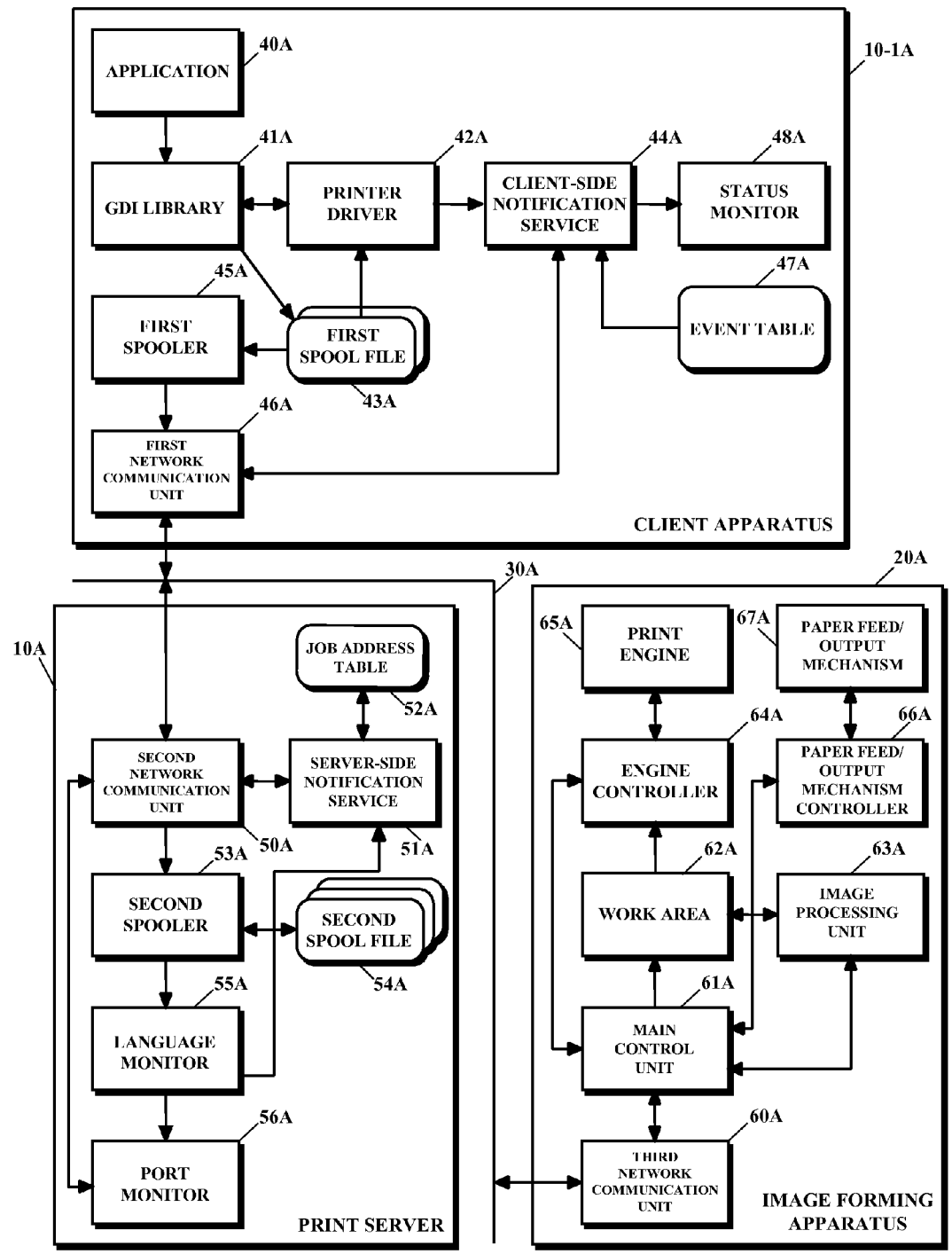
FIG. 7 is a block diagram illustrating the functional configurations of a print server, a client apparatus, and an image forming apparatus, each of which are part of an image forming system according to a second embodiment of the present disclosure.

FIG. 7 is a block diagram illustrating the functional configurations of a print server 10A, a client apparatus 10-1A, and an image forming apparatus 20A, each of which are part of the image forming system according to a second embodiment of the present disclosure.

In the second embodiment, when an application 40A calls the EndDoc function within a GDI library 41A, conversion process for a single job ends. A printer driver 42A writes the IP address of the client apparatus 10-1A into a first spool file 43A using PJL (Printer Job Language). Step S10 and step S11 illustrated in FIG. 4B are not necessary.

A language monitor 55A, upon receipt of a second spool file 54A from a second spooler 53A, provides both a job ID and an IP address included in this file to a server-side notification service 51A and requests registration. The server-side notification service 51A registers, in the job address table 52 illustrated in FIG. 5A, a record including both the job ID and IP address.

The configurations and operations of other configuration blocks in the second embodiment are the same as those in the first embodiment.

III. Third Embodiment

Figure 8:
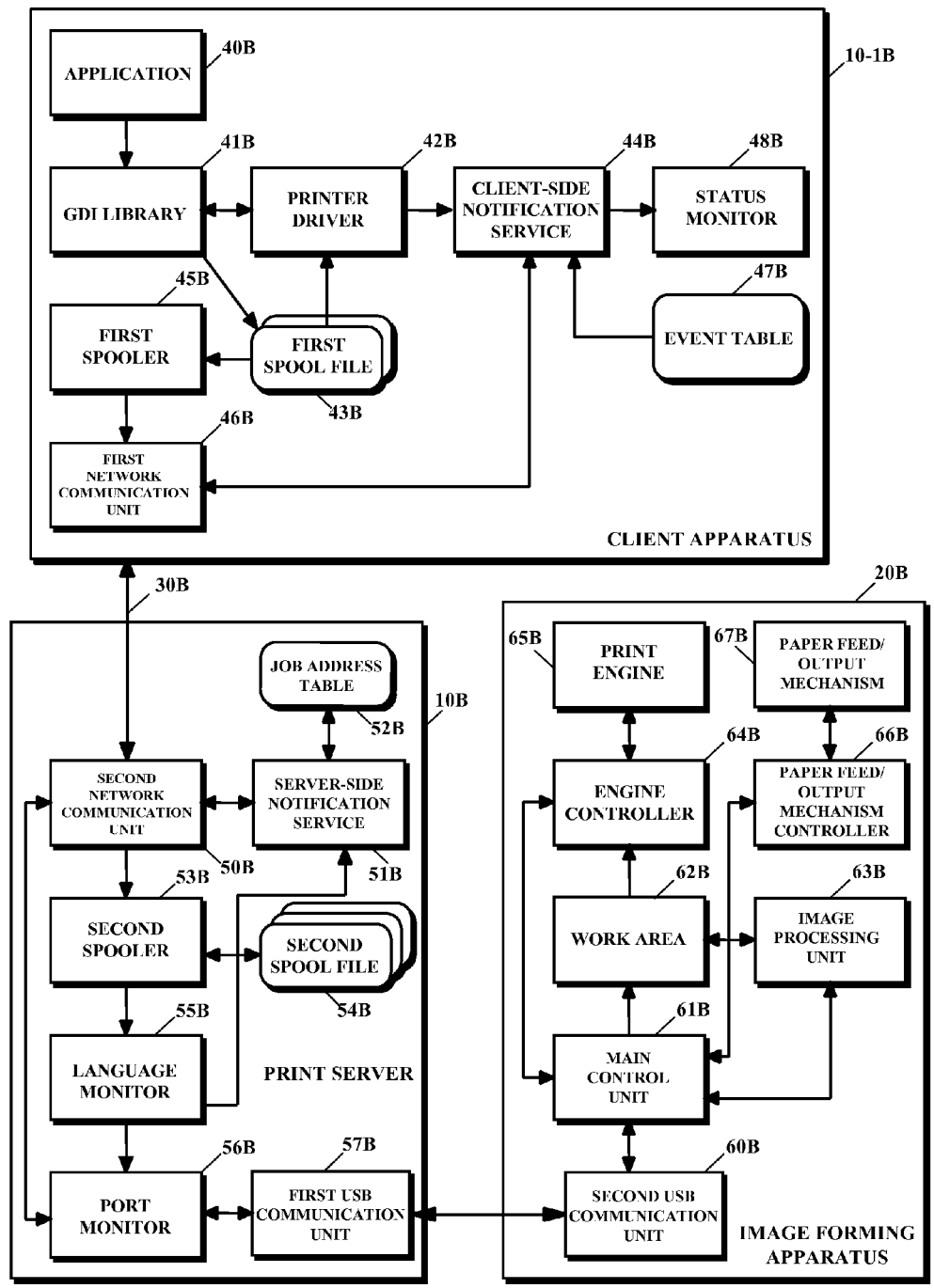
FIG. 8 is a block diagram illustrating the functional configurations of a print server, a client apparatus, and an image forming apparatus, each of which are part of an image forming system according to a third embodiment of the present disclosure.

FIG. 8 is a block diagram illustrating the functional configurations of a print server 10B, a client apparatus 10-1B, and an image forming apparatus 20B, each of which are part of the image forming system, according to a third embodiment of the present disclosure.

In the third embodiment, the print server 10B includes a first USB communication unit 57B, and the image forming apparatus 20B includes a second USB communication unit 60B. With this configuration, the print server 10 and the image forming apparatus 20B are locally coupled to each other.

The configurations and operations of other configuration blocks in the third embodiment are the same as those in the first embodiment or the second embodiment. Note that the configuration of the image forming apparatus in the third embodiment is applicable to the image forming systems of the above-described first and second embodiments.

While various aspects and embodiments have been disclosed herein, other aspects and embodiments are possible. Other designs may be used in which the above-described components are each present.

In the first, second, and third embodiments, for example, a configuration may be employed in which the application 40 writes data into the spool file 43 in an Extended Meta File (EMF) format using the GDI library 41, and a printer driver provided in the spooler 53 converts EMF data into PDL data.

In the first embodiment, a configuration may be employed in which the language monitor 55 is omitted.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming system comprising:
a client apparatus that is coupled to a network;
a print server that is coupled to the network; and
an image forming apparatus that is coupled to the network,
wherein the client apparatus includes:
 a status monitor configured to display a content of an event in the image forming apparatus;
 a printer driver configured to i) convert document data into print job data, ii) generate a job ID of the print job data, iii) provide the job ID to a client-side notification service of the client apparatus, and iv) transmit the print job data to the image forming apparatus via the print server; and the client-side notification service configured to i) transmit the provided job ID together with an IP address of the client apparatus to a server-side notification service of the print server via the network and ii) cause the content of the event received from the server-side notification service to be displayed on the status monitor, wherein the print server includes:
   a job address table including a field in which the IP address of the client apparatus is associated with the job ID, wherein the IP address of the client apparatus and the job ID comprise a single record, and wherein the job address table includes a plurality of registered IP addresses corresponding to a plurality of registered client-side notification services; and
   the server-side notification service configured to i) register the job ID and the IP address received from the client-side notification service in the job address table, ii) receive the content of the event transmitted from the image forming apparatus via the network, wherein the content of the event includes a status code and the job ID if the status code indicates a job status of "Start", "Stop", "Pause", "Resume", or "Completed", iii) read the IP address associated with the job ID included in the content of the event from the job address table if the status code indicates the job status, iv) transmit the content of the event to the client-side notification service of the client apparatus having the read IP address, and v) transmit the content of the event to the plurality of registered client-side notification services corresponding to the plurality of registered IP addresses if the status code indicates an image forming apparatus status of "Ready", "Printing", or "Out of Toner".

2. The image forming system according to claim 1, wherein, when the event is completion of the print job, the server-side notification service is further configured to delete a record that includes the job ID of the print job and the IP address associated with the job ID from the job address table.

3. The image forming system according to claim 1, wherein the printer driver is further configured to generate a globally unique identifier (GUID) and write the GUID into a spool file as the job ID.

4. The image forming system according to claim 3, wherein the client apparatus further includes a first spooler and the printer server further includes a second spooler, wherein the first spooler, when writing of the print job data into the spool file is completed, is configured to put an identifier of the print job data into a queue and supply the spool file to the second spooler every time the identifier is acquired from a head of the queue.

5. The image forming system according to claim 4, wherein the print server further includes a language monitor and a port monitor, and
wherein the second spooler is configured to cause the spool file to be transmitted to the port monitor via the language monitor in the spooling order.

6. The image forming system according to claim 5, wherein the printer driver is further configured to write the IP address of the client apparatus into the spool file, and
wherein the language monitor is configured to acquire the job ID and the IP address from the print job data and provide the job ID and the IP address to the server-side notification service.

7. The image forming system according to claim 1, wherein the image forming apparatus is locally coupled to the print server, and the client apparatus and the print server are coupled to each other via the network.

8. The image forming system according to claim 1, wherein communication between the client-side notification service and the server-side notification service is performed using a Simple Object Access Protocol (SOAP).

9. The image forming system according to claim 1, wherein converting document data into print job data comprises calling a function within a Graphic Device Interface (GDI) library.

10. An image forming method using a client apparatus that is coupled to a network, a print server that is coupled to the network, and an image forming apparatus that is coupled to the network, the method comprising:
   via the client apparatus,
      converting document data into print job data;
      generating a job ID of the print job data;
      transmitting the print job data to the image forming apparatus via the print server;
      transmitting the job ID together with an IP address of the client apparatus to the print server; and
      causing content of an event in the image forming apparatus received from the print server to be displayed on a status monitor of the client apparatus;
   via the print server,
      registering the job ID and the IP address received from the client apparatus in a job address table, wherein the IP address received from the client apparatus and the job ID comprise a single record, and wherein the job address table includes a plurality of registered IP addresses corresponding to a plurality of registered client-side notification services;
      receiving the content of the event transmitted from the image forming apparatus, wherein the content of the event includes a status code and the job ID if the status code indicates a job status of "Start", "Stop", "Pause", "Resume", or "Completed";
      reading the IP address associated with the job ID included in the content of the event from the job address table if the status code indicates the job status;
      transmitting the content of the event to the client apparatus having the read IP address; and
      transmitting the content of the event to the plurality of registered client-side notification services corresponding to the plurality of registered IP addresses if the status code indicates an image forming apparatus of "Ready", "Printing", or "Out of Toner".

11. The image forming method according to claim 10, further comprising:
   via the print server,
      deleting, when the event is completion of the print job, a record that includes the job ID of the print job and the IP address associated with the job ID from the job address table.

12. The image forming method according to claim 11, further comprising:
   via the client apparatus,
      putting, when writing of the print job data into the spool file is completed, an identifier of the print job data into a queue; and
      supplying the spool file to a second spooler of the print server every time the identifier is acquired from a head of the queue.

13. The image forming method according to claim 12, further comprising:
  via the client apparatus,
    writing the IP address of the client apparatus into the spool file using a printer job language (PJL); and
  via the print server,
    acquiring the job ID and the IP address from the print job data.

14. The image forming method according to claim 10, further comprising:
  via the client apparatus,
    generating a globally unique identifier (GUID) and writing the GUID into a spool file as the job ID.

15. The image forming method according to claim 10,
  wherein the image forming apparatus is locally coupled to the print server, and the client apparatus and the print server are coupled to each other via the network.

16. The image forming method according to claim 10, further comprising:
  wherein communication between the client apparatus and the print server is performed using a Simple Object Access Protocol (SOAP).

17. The image forming method according to claim 10,
  wherein converting document data into print job data comprises calling a function within a Graphic Device Interface (GDI) library.

18. The image forming method according to claim 17,
  wherein calling the function within the GDI library comprises converting GDI drawing data to page description language (PDL) data that can be interpreted by the image forming apparatus.

\* \* \* \* \*